(12) United States Patent
Kallugudde et al.

(10) Patent No.: US 11,443,325 B2
(45) Date of Patent: Sep. 13, 2022

(54) COMPUTER SYSTEM AND COMPUTER-IMPLEMENTED METHOD FOR PROCESSING AN ELECTRONIC COMMERCE TRANSACTION USING A NETWORK

(71) Applicant: Mastercard International Incorporated, Purchase, NY (US)

(72) Inventors: Manu Dharmaiah Kallugudde, Mumbai (IN); Satya Sudipta Padhiary, Mumbai (IN)

(73) Assignee: Mastercard International Incorporated, Purchase, NY (US)

( * ) Notice: Subject to any disclaimer, the term of this patent is extended or adjusted under 35 U.S.C. 154(b) by 447 days.

(21) Appl. No.: 16/561,261

(22) Filed: Sep. 5, 2019

(65) Prior Publication Data

US 2020/0090184 A1 Mar. 19, 2020

(30) Foreign Application Priority Data

Sep. 13, 2018 (SG) .......................... 10201807921X (51) Int. Cl.
*G06Q 20/42* (2012.01)
*G06Q 20/40* (2012.01)
(Continued)

(52) U.S. Cl.
CPC ......... *G06Q 20/42* (2013.01); *G06Q 20/3674* (2013.01); *G06Q 20/4014* (2013.01); *H04L 9/3228* (2013.01); *H04L 2209/56* (2013.01)

(58) Field of Classification Search
CPC ............... G06Q 20/42; G06Q 20/3674; G06Q 20/4014; H04L 9/3228; H04L 2209/56
See application file for complete search history.

(56) References Cited

U.S. PATENT DOCUMENTS

| 7,716,129 B1 * | 5/2010 | Tan | ................. G06Q 20/32 |
| | | | 705/40 |
| 10,891,622 B2 * | 1/2021 | Groarke | ................. G06Q 20/12 |

(Continued)

FOREIGN PATENT DOCUMENTS

| EP | 3062270 A1 * | 8/2016 | ........... G06Q 20/382 |
| WO | WO-2009048191 A1 * | 4/2009 | ............. G06F 21/31 |

*Primary Examiner* — Jacob C. Coppola
(74) *Attorney, Agent, or Firm* — Hovey Williams LLP (57) ABSTRACT

A payment network server for processing an electronic commerce (e-commerce) transaction initiated by a customer is described. The server comprises at least a computer processor and a data storage device, where the data storage device comprises instructions operative by the processor to: (i) receive, from a merchant server, an authentication request, the authentication request comprising at least a payment card identifier associated with a payment card; (ii) generate an authentication code associated with the e-commerce transaction for authenticating the customer; (iii) store, in a payment network database, the authentication code as a stored authentication code; (iv) transmit, the authentication code for transmission to the customer and an indication of the payment card to an issuer server; (v) receive, from the merchant server, a customer entered authentication code which was entered by the customer into a merchant website associated with the merchant server; (vi) determine if the customer entered authentication code matches the stored authentication code; if the customer entered authentication code matches the stored authentication code: (vii) generate an authentication indication; (viii) store, in the payment network database, the authentication indication as a stored authentication indication; and (ix) transmit, to the merchant server, an authentication response comprising the authentication indication.

20 Claims, 6 Drawing Sheets

(51) Int. Cl.
  *G06Q 20/36*  (2012.01)
  *H04L 9/32*   (2006.01)

(56) References Cited

U.S. PATENT DOCUMENTS

| | | | | |
|---|---|---|---|---|
| 11,188,912 | B2* | 11/2021 | Kirby | G06Q 20/4014 |
| 11,222,329 | B2* | 1/2022 | Pardo | G06Q 20/3572 |
| 2004/0030659 | A1* | 2/2004 | Gueh | G06Q 20/3674 |
| | | | | 705/67 |
| 2006/0144925 | A1* | 7/2006 | Jones | G06Q 20/40 |
| | | | | 235/380 |
| 2007/0143628 | A1* | 6/2007 | Genda | G06F 21/32 |
| | | | | 713/184 |
| 2012/0011066 | A1* | 1/2012 | Telle | G06Q 20/425 |
| | | | | 705/44 |
| 2012/0226612 | A1* | 9/2012 | Kurtis | G06Q 40/00 |
| | | | | 705/44 |
| 2015/0039506 | A1* | 2/2015 | Groarke | G06Q 20/401 |
| | | | | 705/44 |
| 2015/0161608 | A1* | 6/2015 | Gilbert | G06Q 20/4014 |
| | | | | 705/44 |
| 2016/0028715 | A1* | 1/2016 | Sivashanmugam | G06Q 20/401 |
| | | | | 726/7 |
| 2016/0140558 | A1* | 5/2016 | Groarke | G06Q 20/401 |
| | | | | 705/44 |
| 2016/0321668 | A1* | 11/2016 | Choi | G06Q 20/3223 |
| 2017/0300895 | A1* | 10/2017 | Shanmugam | G06Q 20/2295 |
| 2017/0330187 | A1* | 11/2017 | Kohli | G06Q 20/409 |
| 2018/0114224 | A1* | 4/2018 | Newland | G06Q 20/32 |
| 2019/0114635 | A1* | 4/2019 | Gurunathan | G06Q 20/4012 |
| 2019/0213585 | A1* | 7/2019 | Patni | G06Q 20/4014 |
| 2019/0392435 | A1* | 12/2019 | Sharma | G06Q 20/12 |
| 2020/0234303 | A1* | 7/2020 | Arumugam | G06Q 20/204 |

* cited by examiner

COMPUTER SYSTEM AND COMPUTER-IMPLEMENTED METHOD FOR PROCESSING AN ELECTRONIC COMMERCE TRANSACTION USING A NETWORK

CROSS REFERENCE TO RELATED APPLICATIONS

This application claims priority to Singaporean Application Serial No. 10201807921X, filed Sep. 13, 2018, which is incorporated herein by reference in its entirety

FIELD OF THE INVENTION

The present invention relates to a computer system and computer-implemented method for processing an electronic commerce (e-commerce) transaction using a network. In particular, the invention relates to authenticating an e-commerce transaction using a network.

BACKGROUND OF THE INVENTION

Electronic commerce (e-commerce) transactions are popular due to their ease of use and convenience. In order to ensure that an e-commerce transaction is an authentic, authorised transaction, a customer initiating the e-commerce transaction is typically required to provide a card verification code (CVC) in addition to a payment card number to complete the transaction. The CVC serves to authenticate a physical presence of the payment card. To further enhance security for the e-commerce transaction, a 2-factor authentication can be performed. A traditional 2-factor authentication process follows 3D secure (3DS) protocols where a one-time-password (OTP) is used to authenticate a customer for the transaction. This is typically done through an access control server (ACS) of an issuing bank, where the customer is authenticated by inputting the OTP at a 3DS authentication page hosted by the ACS.

However, authentication performed at the 3DS authentication page, or using similar authentication methods, presents a number of limitations. For example, the 3DS authentication page is not compatible with all websites or application systems (e.g. mobile apps) and therefore may not load properly during authentication. This unreliability of the 3DS authentication page in the present framework adversely reduces a number of approved e-commerce transactions and therefore provides a poor experience to customers. A layout of the 3DS authentication page may also be different across different issuing banks. This causes disconcertment to customers who may be led to suspect that a different look and feel of the 3DS authentication page is due to a fraudulent activity.

It is therefore an aim of the present invention to provide a computer system and computer-implemented method to address at least some of the problems identified above.

SUMMARY OF THE INVENTION

In accordance with a first aspect of the present invention, there is provided a payment network server for processing an electronic commerce (e-commerce) transaction initiated by a customer. The server comprising at least a computer processor and a data storage device, the data storage device comprising instructions operative by the processor to:

receive, from a merchant server, an authentication request, the authentication request comprising at least a payment card identifier associated with a payment card;
generate an authentication code associated with the e-commerce transaction for authenticating the customer;
store, in a payment network database, the authentication code as a stored authentication code;
transmit, the authentication code for transmission to the customer and an indication of the payment card to an issuer server;
receive, from the merchant server, a customer entered authentication code which was entered by the customer into a merchant website associated with the merchant server;
determine if the customer entered authentication code matches the stored authentication code; and
if the customer entered authentication code matches the authentication code:
   generate an authentication indication if the customer entered authentication code matches the authentication code;
   store, in the payment network database, the authentication indication as a stored authentication indication; and
   transmit, to the merchant server, an authentication response comprising the authentication indication.

Embodiments of the invention therefore provide a payment network server that can be used for processing an e-commerce transaction initiated by a customer. In particular, the payment network server is configured to: (i) receive an authentication request from a merchant server; (ii) generate an authentication code associated with the e-commerce transaction for authenticating the customer; (iii) store the authentication code as a stored authentication code in a payment network database; (iv) transmit the authentication code along with a payment card identifier to an issuer server, the authentication code for transmission to the customer; (v) receive a customer entered authentication code entered by the customer into a merchant website from the merchant server; (vi) determine if the customer entered authentication code matches the stored authentication code; and if the customer entered authentication code matches the stored authentication code: (vii) generate an authentication indication; (viii) store the authentication indication as a stored authentication indication in the payment network database; and (ix) transmit an authentication response comprising the authentication indication to the merchant server. As such, the authentication code and the authentication indication are generated by the payment network server. In this way, authentication of the customer and the e-commerce transaction is performed by the payment network server in place of an access control server (ACS) in the present framework. This provides a new way for authentication so that it is no longer necessary for a merchant server to load a 3DS authentication page hosted by the ACS for authenticating a customer. Instead, the merchant server is enabled to generate a customised authentication webpage for payments which is standardised across different issuer institutions, for example by using an application programming interface (API) associated with the payment network server (e.g. provided by the payment network server to the merchant server). This provides a better customer experience since the customer interfaces with a same authentication page for each payment transaction regardless of an issuing bank of the payment card used, and does not need to be wary that potential fraudulent activities may have taken place due to a different look and feel of the 3DS authentication page associated with different issuer institutions. Moreover, in a merchant's point of view, centralised authentication by the payment network server makes authentication processes easier and simpler as the merchant does not have to liaise separately with each of the different issuer institutions. Furthermore, it also eases a capability of the merchant server as the merchant server does not have to interface with the ACS servers of multiple issuer institutions individually for authenticating the customer since authentication is now processed centrally at the payment network server.

In addition, embodiments of the invention may use present infrastructures so that minimal costs will be incurred to implement the above. The primary set-up required is to store information related to authentication codes and authentication indications associated with each e-commerce transaction. This can be easily implemented using existing memory storages, servers and/or databases.

The processor may be configured to:
receive, from the merchant server, a transaction request comprising a received authentication indication, the payment card identifier and a payment amount associated with the e-commerce transaction;
determine if the received authentication indication matches the stored authentication indication;
generate an on-behalf service message if the received authentication indication matches the stored authentication indication, the on-behalf service message indicating that the e-commerce transaction has been authenticated;
transmit, to the issuer server, an authorisation request comprising the on-behalf service message, the indication of the payment card and the payment amount;
receive, from the issuer server, an authorisation response indicating if the e-commerce transaction is authorised or refused; and
transmit, to the merchant server, a transaction response indicating whether the e-commerce transaction is approved or refused, the e-commerce transaction is approved if it is authorised.

Where the payment card identifier comprises a token, the processor may be configured to:
identify, using a payment network database, a payment card number associated with the token, and the indication of the payment card.

In accordance with a second aspect of the present invention, there is provided a computer-implemented method for processing an e-commerce transaction initiated by a customer, the method comprising:
receiving, from a merchant server, an authentication request, the authentication request comprising at least a payment card identifier;
generating an authentication code associated with the e-commerce transaction for authenticating the customer;
storing, in a payment network database, the authentication code as a stored authentication code;
transmitting, the authentication code for transmission to the customer and an indication of the payment card to an issuer server;
receiving, from the merchant server, a customer entered authentication code which was entered by the customer into a merchant website associated with the merchant server;
determining if the customer entered authentication code matches the stored authentication code; and if the customer entered authentication code matches the stored authentication code:
generating an authentication indication if the customer entered authentication code matches the stored authentication code;
storing, in the payment network database, the authentication indication as a stored authentication indication; and
transmitting, to the merchant server, an authentication response comprising the authentication indication.

The method may comprise:
receiving, from the merchant server, a transaction request comprising a received authentication indication, the payment card identifier and a payment amount associated with the e-commerce transaction;
determining if the input authentication indication matches the stored authentication indication;
generating an on-behalf service message if the input authentication indication matches the stored authentication indication, the on-behalf service message indicating that the e-commerce transaction has been authenticated;
transmitting, to the issuer server, an authorisation request comprising the on-behalf service message, the indication of the payment card and the payment amount;
receiving, from the issuer server, an authorisation response indicating if the e-commerce transaction is authorised or refused; and
transmitting, to the merchant server, a transaction response indicating whether the e-commerce transaction is approved or refused, the e-commerce transaction is approved if it is authorised.

Where the payment card identifier comprises a token, the method may comprise:
identifying, using a payment network database, a payment card number associated with the token, and the indication of the payment card.

The payment card identifier may comprise a payment card number of the payment card.

The merchant website may be designed using an application programming interface (API) associated with the payment network server.

The authentication code may be a one-time password (OTP).

The authentication code may be valid for a predetermined authentication code time period.

The authentication indication may be valid for a predetermined authentication indication time period.

The authentication indication may be an accountholder authorisation value (AAV) or a cardholder authentication verification value (CAVV).

In accordance with a third aspect of the present invention, a non-transitory computer-readable medium having stored thereon program instructions for causing at least one processor to perform the preceding method.

Embodiments of the present invention aim to provide a new and useful computer system and computer-implemented method for processing an e-commerce transaction initiated by a customer to enhance a customer experience and to provide convenience to merchants for authenticating the e-commerce transaction.

Other desirable features and characteristics will become apparent from the subsequent detailed description and the appended claims, taken in conjunction with the accompanying drawings of the disclosure.

BRIEF DESCRIPTION OF THE DRAWINGS

Non-limiting embodiments of the invention will now be described for the sake of example only, with reference to the following drawings in which.

DETAILED DESCRIPTION OF THE EMBODIMENT

As used herein, the term "e-commerce transaction" refers to any card-not-present transaction which can be processed electronically. A typical e-commerce transaction may involve a customer making a purchase of a product on a merchant website associated with a merchant server. Other forms of an e-commerce transaction, for example funds transfer or bill payment, may be envisaged as long as there involves a movement of funds between two parties.

Note that the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. In addition, the "payment card" may exist as application-based stored value accounts associated with an electronic wallet service provider tied in with an issuer institution.

Note that the term "institution" is used here in a sense which is not necessarily limited to organizations which are legally constituted as banks, since in some jurisdictions other organizations may be permitted to maintain financial accounts such as a payment card account. An institution may be one of the following: a bank, a financial technology company, a telecommunication company or a financial institution.

As used in this application, the terms "component," "module," "system," "apparatus," "interface," or the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component or a module. One or more components/modules may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Figure 1:
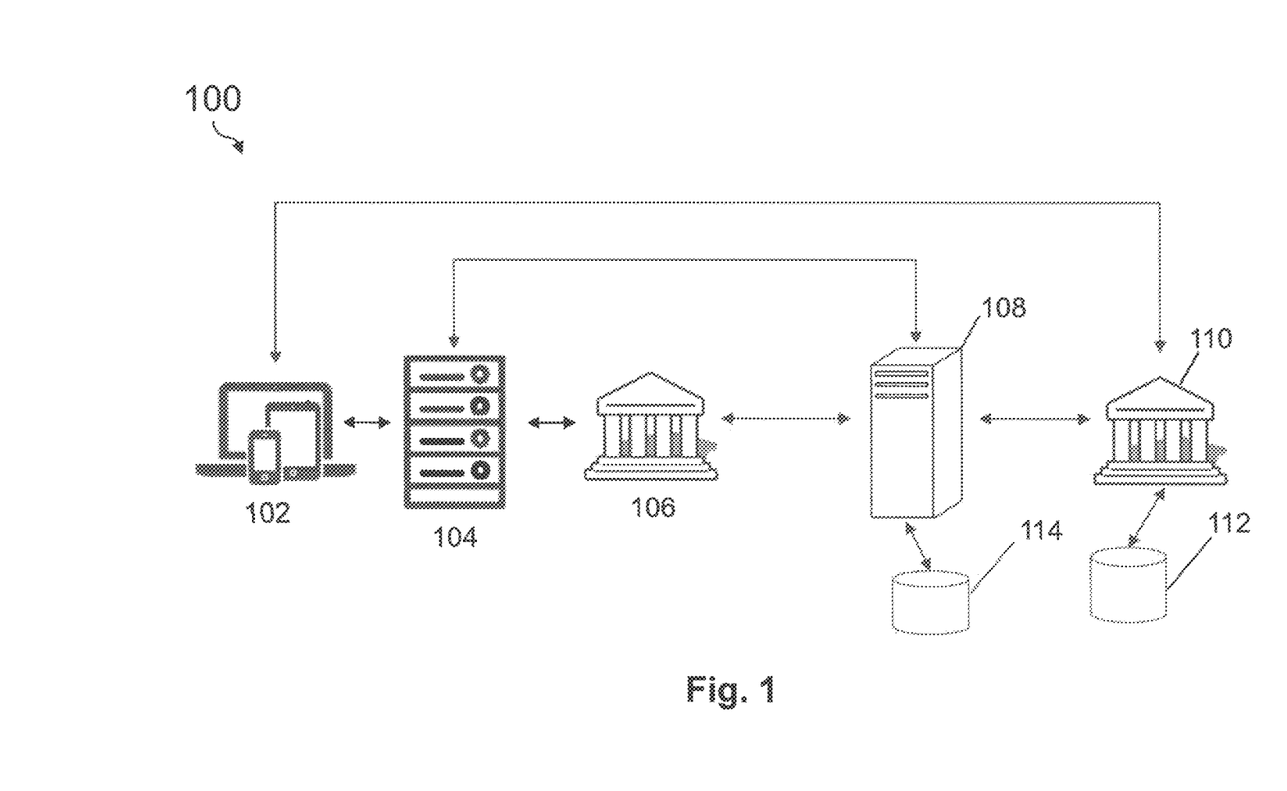
FIG. 1 shows a computer system for processing an e-commerce transaction initiated by a customer in accordance with an embodiment of the invention.

FIG. 1 shows a computer system 100 for processing an e-commerce transaction initiated by a customer in accordance with an embodiment of the invention. The computer system 100 comprises a payment network server 108 which facilitates a payment transaction between a customer and a merchant. The payment network server 108 is a server associated with a payment network such as the Banknet payment network operated by Mastercard. As shown in FIG. 1, the payment network server 108 is in communication with an acquirer server 106 and an issuer server 110. The acquirer server 106 is operated by an acquirer institution at which the merchant maintains a merchant account to receive funds. The issuer server 110 is associated with an issuer institution which maintains at least a customer account which can be used for payment in payment transactions (e.g. an e-commerce transaction using a merchant website associated with a merchant). The computer system 100 further comprises a customer electronic device 102 and a merchant server 104. The customer electronic device 102 is any electronic device which enables the customer to purchase product(s) online through e-commerce sites associated with a merchant. The customer electronic device 102 may be a mobile phone, a laptop/notebook, a desktop, a tablet, a personal digital assistant (PDA), a key fob, a transponder device, a NFC-enabled device, and/or a computer. The merchant server 104 may be associated with an e-commerce site on which payment transactions can be initiated. Moreover, an issuer database 112 is operationally connected to the issuer server 110. The issuer database 112 serves at least to store data related to a customer account associated with the customer which can be used for payment in an e-commerce transaction. The data associated with the customer account may comprise a customer account number (e.g. a payment card number), details associated with the customer (e.g. a customer name, a customer's date of birth etc.), contact details associated with the customer (e.g. a customer mobile number, a customer email address, a customer home/work address, a customer home number etc.) and details associated with a status of the customer account (e.g. an available balance, transaction history etc.). In addition, a payment network database 114 is operationally connected to the payment network server 108. The payment network database 114 is configured to store data related to at least one e-commerce transaction associated with the customer (e.g. a payment amount, a payment card number associated with the customer etc.). Moreover, the payment network database 114 is configured to store authentication codes and authentication indications generated for use in authenticating e-commerce transactions. Although the issuer database 112 and the payment network database 114 are shown as external databases in FIG. 1, these databases 112, 114 may also form part of the issuer server 110 and the payment network server 108 respectively.

Embodiments of the present invention aim to build upon present infrastructure for processing an e-commerce transaction. In particular, embodiments of the present invention involve migrating the process of customer authentication for an e-commerce transaction from an access control server (ACS) of an issuer institution to a network, for example through the use of a payment network server 108. This involves the generation and verification of an authentication code and an authentication indication associated with an e-commerce transaction by the payment network server 108 in place of the ACS. In doing so, it is no longer necessary for the merchant server 104 to load an authentication page hosted by the ACS for authenticating a customer. Instead, the merchant server 104 is enabled to generate a customized authentication webpage for payments which is standardized for different issuer institutions, for example by using an application programming interface (API) associated with the payment network server (e.g. provided by the payment network server). This provides a better customer experience since the customer interfaces with a same authentication page for each payment transaction regardless of an issuing bank of the payment card used, and does not need to be wary that potential fraudulent activities may have taken place due to a different look and feel of the 3DS authentication page associated with different issuer institutions. Moreover, in a merchant's point of view, centralised authentication by the payment network server 108 makes authentication processes easier and simpler as the merchant does not have to liaise separately with each of the different issuer institutions. Furthermore, it also eases a capability of the merchant server 104 as the merchant server 104 does not have to interface with ACS servers of multiple different issuer institutions individually for authenticating the customer since authentication is now processed centrally at the payment network server 108.

In order to achieve the above, the payment network server 108 is configured to: (i) receive an authentication request comprising at least a payment card identifier from the merchant server 104; (ii) generate an authentication code associated with the e-commerce transaction for authenticating the customer; (iii) store the authentication code as a stored authentication code in the payment network database 114; (iv) transmit the authentication code and an indication of the payment card to the issuer server 110, so that the authentication code can be transmitted to the customer by the issuer server; (v) receive a customer entered authentication code entered by the customer into a merchant website from the merchant server 104; (vi) determine if the customer entered authentication code matches the stored authentication code; if the customer entered authentication code matches the stored authentication code: (vii) generate an authentication indication; (viii) store the authentication indication as a stored authentication indication in the payment network database 114; and (ix) transmit an authentication response comprising the authentication indication to the merchant server 104.

In embodiments of the present invention, in order to process an e-commerce transaction initiated at a merchant e-commerce website, an authentication request is transmitted from the merchant server 104 to the payment network server 108 (directly or via the acquirer server 106). The authentication request comprises at least a payment card identifier associated with a payment card used for payment of the e-commerce transaction. A payment card identifier may be a payment card number or a token associated with the payment card. Upon receiving the authentication request, the payment network server 108 is configured to generate an authentication code associated with the e-commerce transaction for authenticating the customer. The authentication code may be dynamically generated and stored in the payment network database 114 for each e-commerce transaction as a stored authentication code. An example of an authentication code is a one-time password (OTP). The authentication code may comprise a string of numbers, symbols or alphanumeric characters.

Once the authentication code is generated and stored, the payment network server 108 is configured to transmit the authentication code and an indication of the payment card to the issuer server 110. The authentication code is for subsequent transmission to the customer. The indication of the payment card is any form of identifier which aids the issuer server 110 in identifying the payment card (and hence the customer associated with the payment card) for authenticating the customer for the e-commerce transaction. The payment card identifier may comprise a payment card number associated with the payment card. In this case, the indication of the payment card transmitted to the issuer server 110 is simply the payment card number. In some embodiments where the payment card identifier comprises a token, the payment network server 108 is configured to identify the payment card number associated with the token and the indication of the payment card using the payment network database 114. Using this form of arrangement, it is therefore not necessary for the payment network server 108 to maintain a record of contact details associated with the customers since the authentication code is transmitted to the issuer server 110 for transmission to the customer. This minimises a burden on the payment network server 108 acting as an authentication site for the e-commerce transaction.

Upon receiving the authentication code from the issuer server 110 (e.g. via the customer electronic device 102), the customer is prompted by the merchant e-commerce website to input the authentication code at the merchant e-commerce website for authentication. In some embodiments, a portion of the authentication code comprises a unique identifier (e.g. a string of alphanumeric) associated with the e-commerce transaction. The payment network server 108 may be configured to transmit this portion of the authentication code to the merchant server 104 in addition to the step of transmitting the authentication code and the indication of the payment card to the issuer server 110 as described above. The portion of the authentication code may be presented to the customer at a merchant authentication page when the customer is prompted to enter the authentication code for authentication at the merchant website such that the customer is required only to fill in a remaining portion of the authentication code (i.e. the authentication code minus the unique identifier) to complete the authentication code for authentication. This embodiment additionally ensures that the authentication code specific to that particular e-commerce transaction is received by the customer for the e-commerce transaction which can be verified by the customer when she compares the portion of the authentication code presented at the merchant authentication page with that received from the issuer server 110.

The customer entered authentication code (e.g. the full authentication code including the unique identifier described above for some embodiments) received at the merchant e-commerce website is transmitted by the merchant server 104 to the payment network server 108 (directly or via the acquirer server 106) for authenticating the customer. Upon receipt of the customer entered authentication code from the merchant server 104, the payment network server 108 is configured to determine if the customer entered authentication code matches the stored authentication code, and to generate an authentication indication if the customer entered authentication code matches the stored authentication code. If the customer entered authentication code does not match the stored authentication code, the payment network server 108 is configured to transmit a response to the merchant server 104 to refuse the e-commerce transaction. The authentication indication may be an accountholder authorisation value (AAV) or a cardholder authentication verification value (CAVV), or any other format which may be accepted by the relevant issuer institution as an appropriate form for authenticating the e-commerce transaction. Once the authentication indication is generated, the payment network server 108 is configured to store the authentication indication in the payment network database 114 as a stored authentication indication, and transmit an authentication response comprising the authentication indication to the merchant server 104 for completing the e-commerce transaction.

To complete the e-commerce transaction, the merchant server 104 is configured to transmit a transaction request comprising a received authentication indication, the payment card identifier and a payment amount associated with the e-commerce transaction to the payment network server 108. This may be done directly or via the acquirer server 106. The received authentication indication is typically the authentication indication received from the payment network server 108 for completing the e-commerce transaction. The payment amount is associated with a monetary amount which the customer has agreed to pay the merchant for goods and/or services associated with the e-commerce transaction. Other information may also be included in the payment transaction request, for example, a card verification coded (CVC), a name of the cardholder, an expiry date of the payment card, etc.

Upon receiving the transaction request from the merchant server 104, the payment network server 108 is configured to determine if the received authentication indication matches the stored authentication indication. If the received authentication indication matches the stored authentication indication, the payment network server 108 is configured to generate an on-behalf service message indicating that the e-commerce transaction has been authenticated. The on-behalf service message may comprise a string of numbers, symbols or alphanumeric characters. The payment network server 108 is then configured to transmit an authorisation request to the issuer server 110 for authorising the e-commerce transaction. The authorisation request comprises the on-behalf service message, the indication of the payment card and the payment amount. In some embodiments, the payment card identifier and the indication of the payment card each comprise the payment card number associated with the payment card. In other embodiments, the payment card identifier comprises a token associated with the payment card. In this case, the payment network server 108 is configured to identify the payment card number associated with the token using the payment network database 114, such that the indication of the payment card transmitted to the issuer server 110 in the authorisation request comprises the identified payment card number. The inclusion of the on-behalf service message serves to indicate to the issuer server 110 that the e-commerce transaction has been authenticated. It may be understood that issuer institutions be enrolled with the payment network server 108 in order for the payment network server 108 to provide the on-behalf authentication service as described herein.

The request for authorisation may comprise the CVC and the expiry date of the payment card. In order to authorise the payment transaction, the issuer server 110 may typically be configured to (i) verify the CVC code and/or (ii) the expiry date of the payment card etc. to determine a validity of the payment card used in the transaction. Moreover, the issuer server 110 may be configured to check an available balance of a customer account associated with the payment card identifier to determine if the available balance is more than the payment amount (or conversely, if the available balance is less than the payment amount). The available balance may comprise any overdraft balance available to the customer account. The issuer server 110 then authorises the payment transaction if the relevant details are verified and that the available balance is equal to or more than the payment amount. The payment network server 108 is configured to receive, from the issuer server 110, an authorisation response indicating if the e-commerce transaction is authorised or refused. The payment network server 108 is then configured to transmit a transaction response indicating whether the e-commerce transaction is approved or refused to the merchant server 104, the e-commerce transaction is approved if it is authorised. Once the e-commerce transaction is approved, the payment amount is deducted from the customer account and deposited in the merchant account by a conventional settlement process.

Although only one customer electronic device 102 and only one merchant server 104 is shown in FIG. 1, a plurality of customer electronic devices 102 and a plurality of merchant servers 104 associated with respective e-commerce sites may also form part of the computer system 100. Similarly, a plurality of acquirer servers 106 and a plurality of issuer servers 110 may also be in communication with the payment network server 108 and form part of the computer system 100. A plurality of issuer databases 112 and/or payment network databases 114 associated with respective issuer servers 110 and payment network servers 108 respectively may also form part of the computer system 100.

Communication between the customer electronic device 102, servers and databases 112, 114 may take place via any type of system, for example, a virtual private system (VPN), the Internet, a local area and/or wide area system (LAN and/or WAN), and so on.

Figure 2:
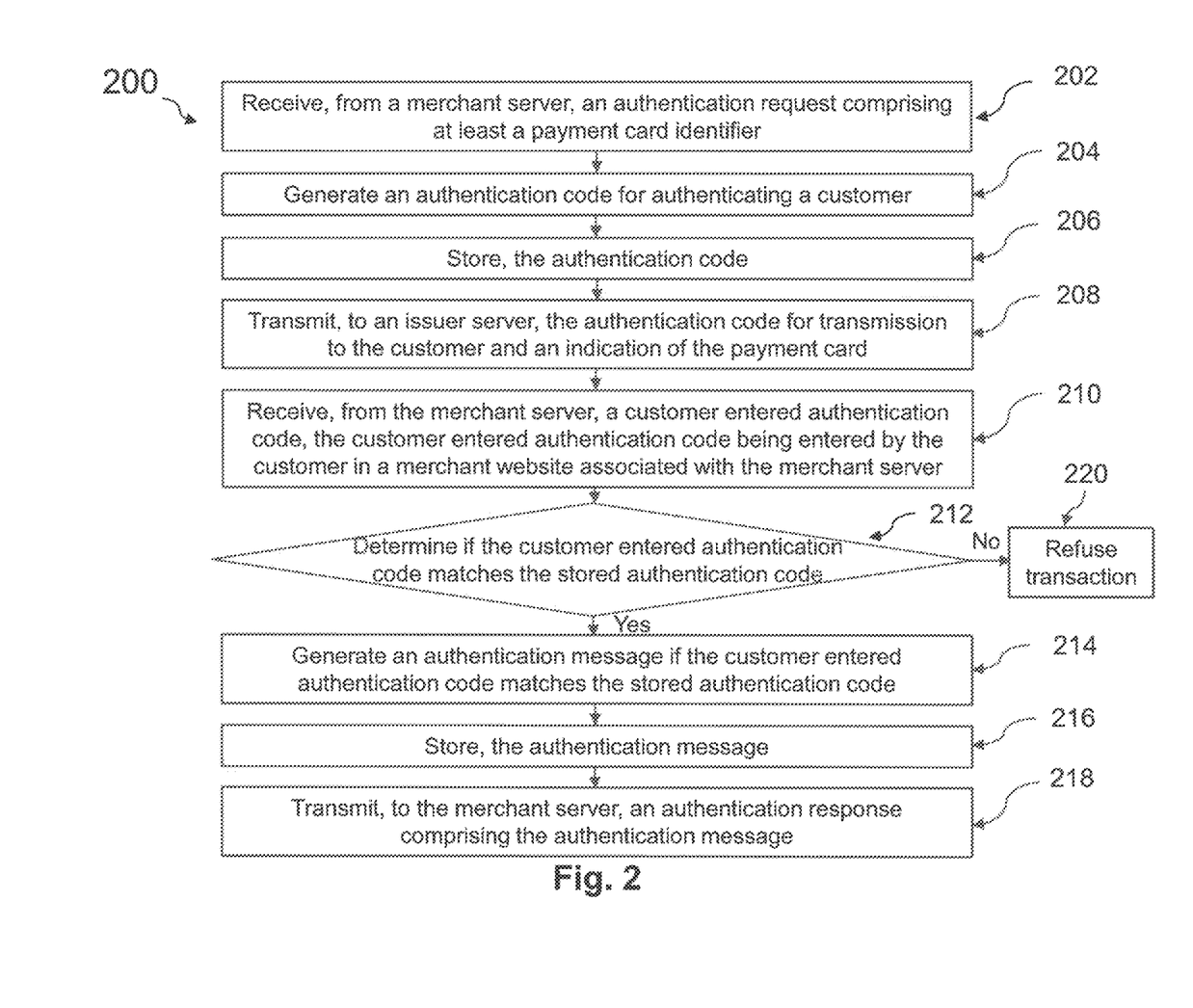
FIG. 2 shows steps of a method for authenticating a customer in an e-commerce transaction which may be performed by a payment network server comprised in the computerised network of FIG. 1 in accordance with an embodiment of the invention.

FIG. 2 shows steps of a method 200 for authenticating a customer in an e-commerce transaction which may be performed by the payment network server 108 comprised in the computerised network of FIG. 1 in accordance with an embodiment of the invention.

In a step 202, the payment network server 108 is configured to receive an authentication request comprising at least a payment card identifier from the merchant server 104.

In a step 204, the payment network server 108 is configured to generate an authentication code associated with the e-commerce transaction for authenticating the customer. The authentication code may be a one-time password. The authentication code may be valid for a predetermined authentication code time period, within which the authentication code is to be entered at the merchant e-commerce website for authenticating the customer for the e-commerce transaction. The predetermined authentication code time period may be a time period of 10 seconds, 20 seconds, 30 seconds, 40 seconds, 50 seconds, 1 minute, 2 minutes, 3 minutes, 5 minutes, 10 minutes or any appropriate period of time that is considered sufficient for the customer to enter the authentication code yet maintaining security for the e-commerce transaction.

In a step 206, the payment network server 108 is configured to store the authentication code as a stored authentication code in the payment network database 114. The stored authentication code may be retrieved by the payment network server 108 for authenticating the customer for the e-commerce transaction.

In a step 208, the payment network server 108 is configured to transmit the authentication code and the payment card identifier to the issuer server 110, the authentication code for transmission to the customer. The authentication code may be transmitted by the issuer server 110 to the customer electronic device 102 associated with the customer using customer contact details (e.g. mobile number or electronic mail (e-mail) addresses) stored in the issuer database 112.

In a step 210, the payment network server 108 is configured to receive a customer entered authentication code from the merchant server 104. The customer entered authentication code is entered by the customer into the merchant website associated with the merchant server 104.

In a step 212, the payment network server 108 is configured to determine if the customer entered authentication code received from the merchant server 104 matches the stored authentication code.

If it is determined that the customer entered authentication code matches the stored authentication code in the step 212, the payment network server 108 is configured to generate an authentication indication in a step 214. The authentication indication may be an accountholder authorisation value (AAV) or a cardholder authentication verification value (CAVV), which can be used to indicate to the issuer server 110 that the e-commerce transaction has been authenticated. The authentication indication may be valid for a predetermined authentication indication time period, within which the authentication indication is to be utilised by the merchant server 104 in completing the e-commerce transaction. The predetermined authentication indication time period may be determined by the issuer institution and may be a time period of 10 seconds, 20 seconds, 30 seconds, 40 seconds, 50 seconds, 1 minute, 2 minutes, 3 minutes, 5 minutes, 10 minutes or any appropriate period of time that is considered sufficient for the completion of the e-commerce transaction.

After generating the authentication indication, the payment network server 108 is configured to store the authentication indication as a stored authentication indication in the payment network database 114 in a step 216.

In a step 218, the payment network server 108 is configured to transmit the authentication indication to the merchant server 104 for use in processing the e-commerce transaction. In some embodiments, if the payment card identifier comprises a token associated with the payment card for use in processing the e-commerce transaction, the payment network server 108 is configured to identify the payment card number associated with the payment card. The payment card number is then transmitted to the issuer server 110 as the indication of the payment card for use in authenticating the customer of the e-commerce transaction.

If it is determined in the step 212 that the customer entered authentication code does not match the authentication code, the payment network server 108 is configured to refuse the e-commerce transaction in a step 220. If the e-commerce transaction is refused, the payment network server 108 may inform the customer (e.g. via the merchant server 104) of a failure to process the e-commerce transaction and may request another form of payment if the customer wishes to continue processing the e-commerce transaction.

Figure 3:
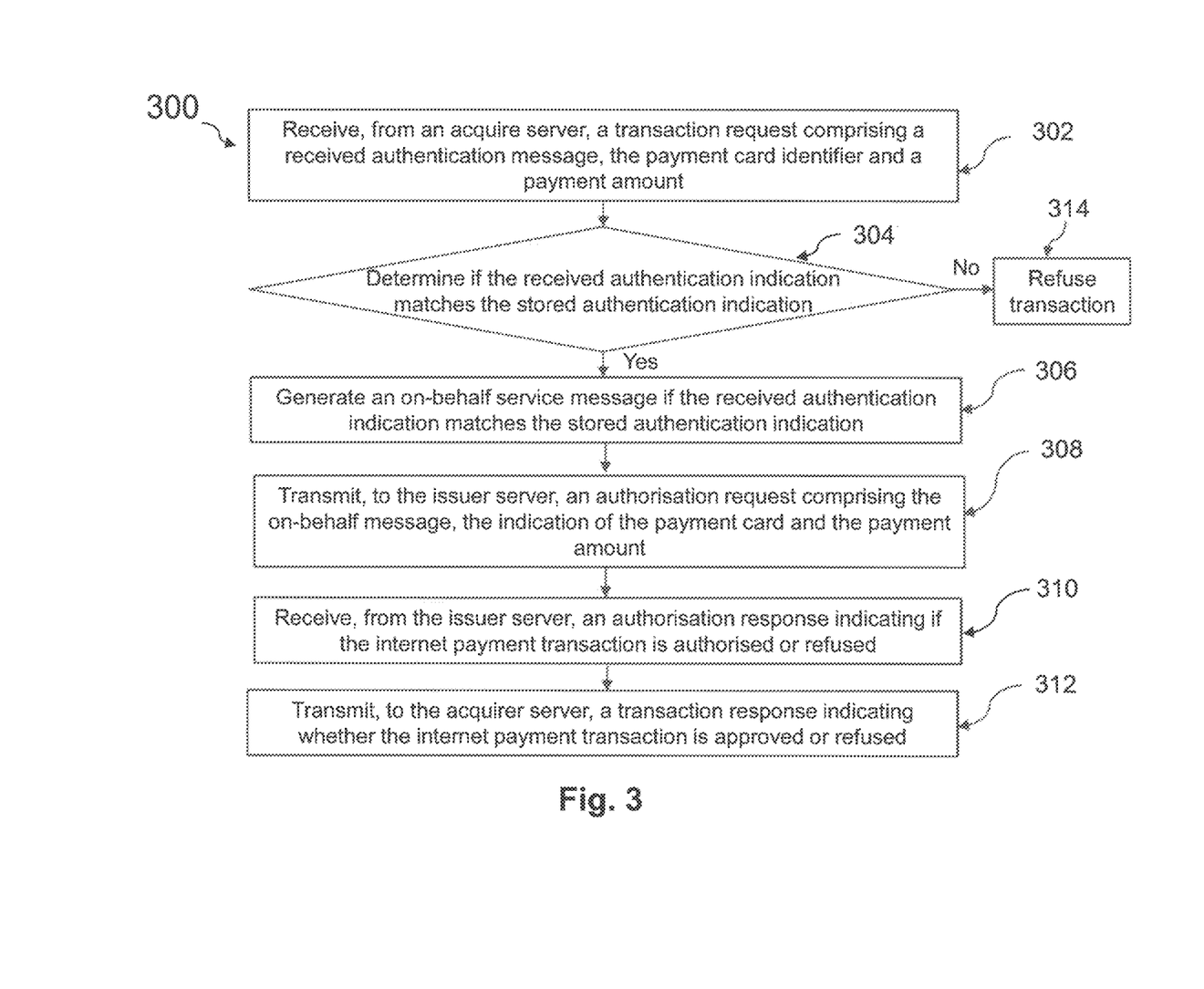
FIG. 3 shows steps of a method for authenticating an e-commerce transaction on behalf of an issuer server which may be performed by a payment network server comprised in the computerised network of FIG. 1 in accordance with an embodiment of the invention.

FIG. 3 shows steps of a method for authenticating an e-commerce transaction on behalf of the issuer server 110 which may be performed by the payment network server 108 comprised in the computerised network of FIG. 1 in accordance with an embodiment of the invention.

In a step 302, the payment network server 108 is configured to receive a transaction request comprising a received authentication indication, the payment card identifier and a payment amount associated with the e-commerce transaction from the merchant server 104. In some embodiments, the transaction request is received from the merchant server 104 via the acquirer server 106.

Upon receipt of the transaction request in the step 302, the payment network server 108 is configured to determine if the received authentication indication matches the authentication indication in a step 304.

If it is determined that the received authentication indication matches the authentication indication in the step 304, the payment network server 108 is configured to generate an on-behalf service message in the step 306. The on-behalf service message serves to indicate that the e-commerce transaction has been authenticated by the payment network server 108 on behalf of the issuer server 110.

In a step 308, the payment network server 108 is configured to transmit an authorisation request comprising the on-behalf service message, the indication of the payment card and the payment amount to the issuer server 110. In some embodiments, if the payment card identifier comprises a token associated with the payment card for use in processing the e-commerce transaction, the payment network server 108 is configured to identify the payment card number associated with the payment card. The payment card number is then transmitted to the issuer server 110 as the indication of the payment card for authorisation of the e-commerce transaction. In some embodiments, if the authorisation request is approved, the issuer server 110 is configured to block the payment amount in the customer account associated with the payment card number. The blocked payment amount ensures that the customer account has sufficient funds to complete the payment transaction once the goods or services have been provided by the merchant.

In a step 310, the payment network server 108 is configured to receive an authorisation response indicating if the e-commerce transaction is authorised or refused from the issuer server 110. The issuer server 110 may verify if the on-behalf service message is valid. Moreover, the issuer server 110 may perform the conventional checks before authorising the payment transaction as discussed previously in relation to FIG. 1.

In a step 312, the payment network server 108 is configured to transmit a transaction response to the merchant server 104 indicating whether the e-commerce transaction is approved or refused, the e-commerce transaction is approved if it is authorised by the issuer server 110. The transaction response may indicate that the payment amount has been blocked in the customer account associated with the payment card and is available to the merchant when the e-commerce transaction is settled.

If it is determined in the step 304 that the input authentication indication does not match the authentication indication generated in the step 214, the payment network server 108 is configured to refuse the e-commerce transaction in a step 314. If the e-commerce transaction is refused, the payment network server 108 may inform the customer (e.g. via the merchant server 104) of a failure to process the e-commerce transaction and may request another form of payment if the customer wishes to continue processing the e-commerce transaction.

Figure 4:
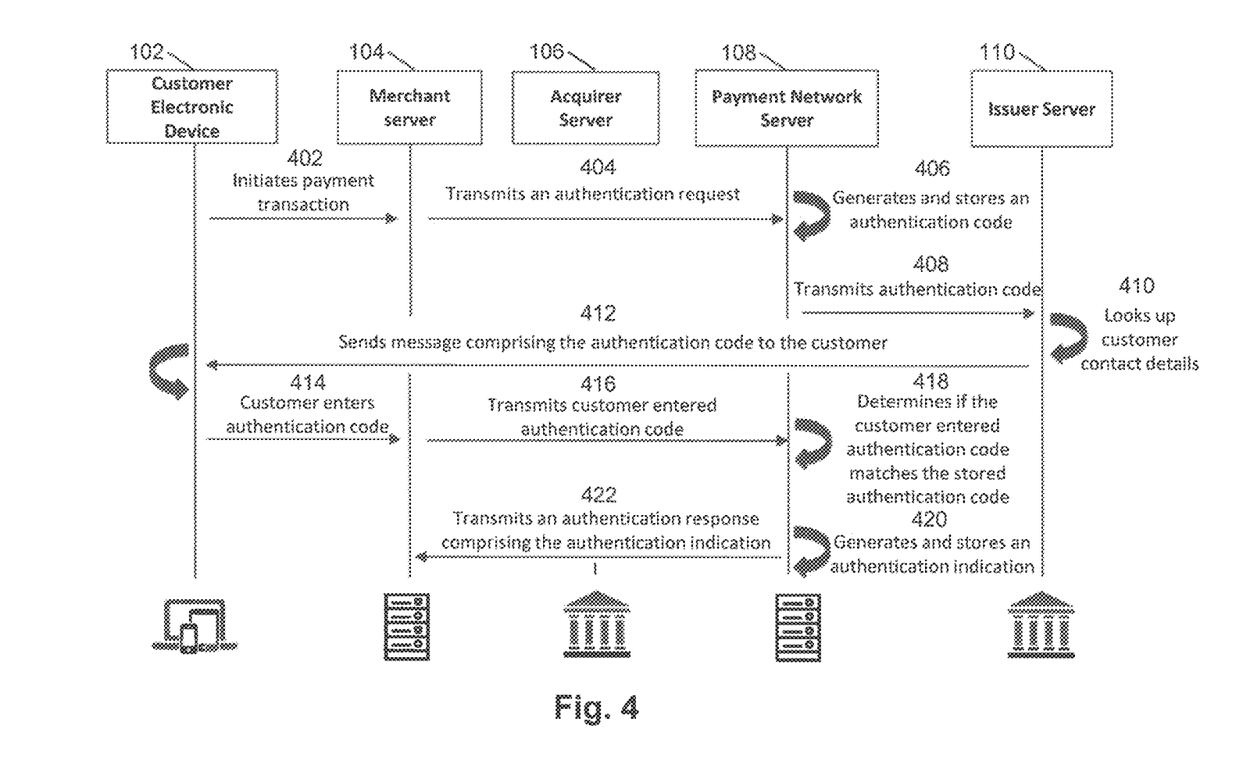
FIG. 4 shows steps of a method for authenticating a customer in an e-commerce transaction in accordance with an embodiment of the invention.

FIG. 4 illustrates an exemplary embodiment for authenticating a customer in an e-commerce transaction. The customer may initiate the e-commerce transaction online via a merchant e-commerce website associated with the merchant server 104.

As shown in FIG. 4, the customer initiates an e-commerce transaction using the customer electronic device 102 at the merchant website associated with the merchant server 104 in a step 402. Initiating the e-commerce transaction comprises providing by the customer, via the customer electronic device 102, at least a payment card identifier (e.g. a payment card number) at the merchant e-commerce website. In some embodiments a CVC code, a name of the cardholder and/or an expiry date of the payment card are also provided. After the e-commerce transaction is initiated by the customer in the step 402, the merchant server 104 is configured to transmit an authentication request for the e-commerce transaction to the payment network server 108 in a step 404. This may be transmitted directly from the merchant server 104 to the payment network server 108 as shown in FIG. 4, or via the acquirer server 106 (not shown). The authentication request comprises at least the payment card identifier associated with the payment card used for payment of the e-commerce transaction.

Upon receipt of the authentication request, the payment network server 108 is configured to generate and store an authentication code associated with the e-commerce transaction for authenticating the customer in a step 406. The authentication code may be dynamically generated and stored in the payment network database 114 for each e-commerce transaction as a stored authentication code. An example of an authentication code is a one-time password (OTP). The authentication code may comprise a string of numbers, symbols or alphanumeric characters. In some embodiments, a portion of the authentication code comprises a unique identifier (e.g. a string of alphanumeric) associated with the e-commerce transaction. The authentication code may be valid for a predetermined authentication code time period, within which the authentication code is to be entered at the merchant e-commerce website for authenticating the customer for the e-commerce transaction. The predetermined authentication code time period may be a time period of 10 seconds, 20 seconds, 30 seconds, 40 seconds, 50 seconds, 1 minute, 2 minutes, 3 minutes, 5 minutes, 10 minutes or any appropriate period of time that is considered sufficient for the customer to enter the authentication code yet maintaining security for the e-commerce transaction.

Once the authentication code is generated in the step 406, the payment network server 108 is configured to transmit the authentication code and an identification of the payment card to the issuer server 110 for transmission to the customer in a step 408. The identification of the payment card may be a payment card number associated with the payment card. In some embodiments where the payment card identifier received is a token associated with the payment card, the payment network server 108 is configured to identify the payment card number associated with the token using the payment network database 114. In this case, the identification of the payment card transmitted to the issuer server 110 in the step 408 comprises the payment card number associated with the payment card. In a step 410, the issuer server 110 is configured to look up customer contact details stored in the issuer database 112 by using the identification of the payment card received in the step 408.

In a step 412, the issuer server 110 is configured to send a message comprising the authentication code to the customer, typically via the customer electronic device 102. In embodiments where a portion of the authentication code comprises a unique identifier associated with the e-commerce transaction, the payment network server 108 may be configured to transmit the portion of the authentication code to the merchant server 104 in addition to transmitting the authentication code and the indication of the payment card to the issuer server 110 (not shown). Upon receipt of the authentication code from the issuer server 110, the customer inputs the authentication code on the merchant e-commerce website for authentication in a step 414. In embodiments where a portion of the authentication code comprising a unique identifier associated with the e-commerce transaction is transmitted to the merchant server 104, the portion of the authentication code may be presented to the customer at a merchant authentication page when the customer is prompted to enter the authentication code for authentication at the merchant website. In this case, the customer is required only to fill in a remaining portion of the authentication code (i.e. the authentication code minus the unique identifier) to complete the authentication code for authentication. In some embodiments, the merchant webpage used for inputting the authentication code is designed by the merchant, and can be configured using an application programming interface associated with the payment network server such that it provides a similar look and feel for the customer for inputting the authentication code even for payment cards associated with different issuer institutions. This enhances a customer shopping experience and potentially minimises glitches in processing the e-commerce transaction which may otherwise occur if authentication pages hosted by ACSs of different issuer institutions are to be loaded for inputting the authentication code as is standard in the present art. The customer entered authentication code received at the merchant e-commerce website is transmitted by the merchant server 104 to the payment network server 108 for authenticating the customer in a step 416. This may be transmitted directly as shown in FIG. 4 or via the acquirer server 106 (not shown).

Upon receipt of the customer entered authentication code in the step 416, the payment network server 108 is configured to determine if the customer entered authentication code matches the stored authentication code in a step 418, and to generate an authentication indication if the customer entered authentication code matches the stored authentication code in a step 420. The authentication indication is stored as a stored authentication indication in the payment network database 114. The authentication indication may be an accountholder authorisation value (AAV) or a cardholder authentication verification value (CAVV). The authentication indication may be valid for a predetermined authentication indication time period, within which the authentication indication is to be utilised by the merchant server 104 in completing the e-commerce transaction. The predetermined authentication indication time period may be determined by the issuer institution and may be a time period of 10 seconds, 20 seconds, 30 seconds, 40 seconds, 50 seconds, 1 minute, 2 minutes, 3 minutes, 5 minutes, 10 minutes or any appropriate period of time that is considered sufficient for the completion of the e-commerce transaction. Once the authentication indication is generated in the step 420, the payment network server 108 is configured to transmit an authentication response comprising the authentication indication to the merchant server in a step 422 for completing the e-commerce transaction.

Figure 5:
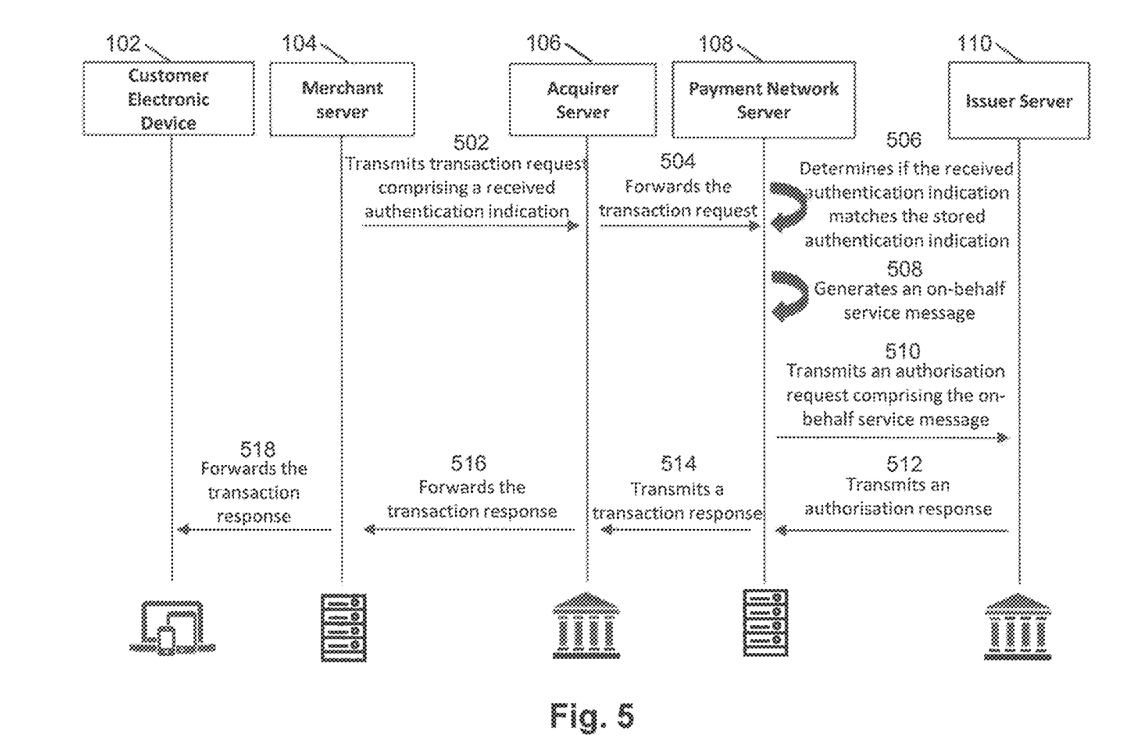
FIG. 5 shows steps of a method for authenticating an e-commerce transaction on behalf of an issuer server in accordance with an embodiment of the invention.

FIG. 5 illustrates an exemplary embodiment for authenticating an e-commerce transaction on behalf of the issuer server 110. The steps in FIG. 5 may be carried out after the customer is authenticated by the payment network server 108 as described in relation to FIG. 4.

To complete the e-commerce transaction, the merchant server 104 is configured to transmit a transaction request comprising a received authentication indication, the payment card identifier and a payment amount associated with the e-commerce transaction to the acquirer server 104 in a step 502, where the transaction request is in turn forwarded by the acquirer server 104 to the payment network server 108 in a step 504. In some embodiments, the merchant server 104 transmits the transaction request directly to the payment network server 108 (not shown). In any case, upon receipt of the transaction request, the payment network server 108 is configured to determine if the received authentication indication matches the stored authentication indication in a step 506. If the received authentication indication matches the stored authentication indication, the payment network server 108 is configured to generate an on-behalf service message indicating that the e-commerce transaction has been authenticated in a step 508. The on-behalf service message may comprise a string of numbers, symbols or alphanumeric characters.

The payment network server 108 is then configured to transmit an authorisation request to the issuer server 110 for authorising the e-commerce transaction in a step 510. The authorisation request comprises the on-behalf service message, the indication of the payment card and the payment amount. The inclusion of the on-behalf service message serves to indicate to the issuer server 110 that the e-commerce transaction has been authenticated. The request for authorisation may comprise the CVC and the expiry date of the payment card. In order to authorise the payment transaction, the issuer server 110 is configured to (i) verify the CVC code and/or (ii) the expiry date of the payment card. The issuer server 110 may also be configured to check an available balance of a customer account associated with the payment card identifier to determine if the available balance is more than the payment amount (or conversely, if the available balance is less than the payment amount). The available balance may comprise any overdraft balance available to the customer account. The issuer server 110 then authorises the payment transaction if the relevant details are verified and that the available balance is equal to or more than the payment amount. In a step 512, the issuer server 110 is configured to transmit an authorisation response to the payment network server 108. The authorisation response serves to indicate if the e-commerce transaction is authorised or refused. Upon receipt of the authorisation response, the payment network server 108 is configured to transmit a transaction response indicating whether the e-commerce transaction is approved or refused to the acquirer server 106 in a step 514. The e-commerce transaction is approved if it is authorised by the issuer server 110. In a step 516, the acquirer server 106 is configured to forward the transaction response to the merchant server, where the merchant server is configured to forward the transaction response to the customer via the customer electronic device 102 in a step 518 to inform the customer of a result of the e-commerce transaction (e.g. if the e-commerce transaction has been successfully processed).

As described in the foregoing, authentication of the customer and the e-commerce transaction therefore does not involve any ACS or any 3DS authentication page to be loaded from the issuer server 110 during authentication. Instead, the merchant (and therefore the merchant server 104) has complete control over the authentication process.

Figure 6:
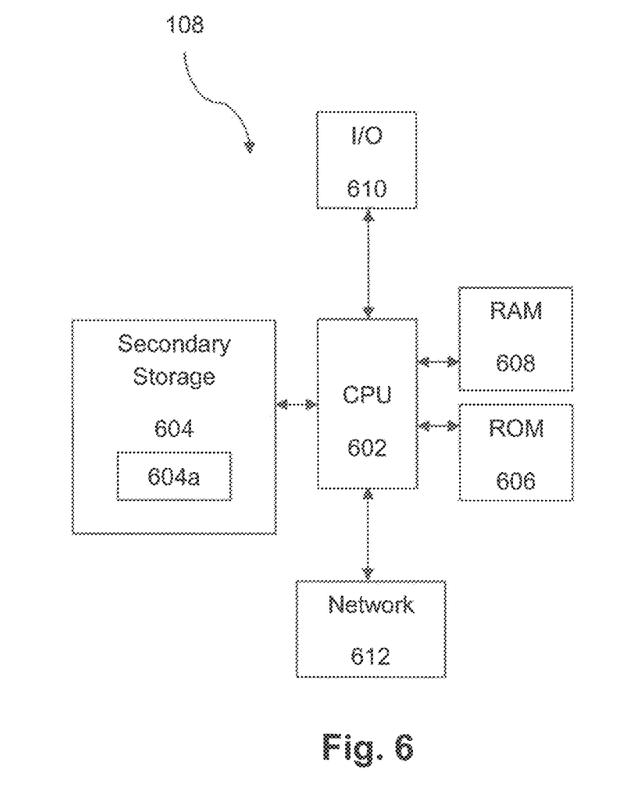
FIG. 6 shows schematically a hardware structure of a server which may be used in the computer system of FIG. 1 to implement a method in accordance with an embodiment of the invention.

FIG. 6 is a block diagram showing a technical architecture of the payment network server 108. The issuer server 110 and/or the acquirer server 106 may also have this technical architecture. The merchant server 104 may share a similar technical architecture.

The technical architecture includes a processor 602 (which may be referred to as a central processor unit or CPU) that is in communication with memory devices including secondary storage 604 (such as disk drives), read only memory (ROM) 606, and random access memory (RAM) 608. The processor 602 may be implemented as one or more CPU chips. The technical architecture may further comprise input/output (I/O) devices 610, and system connectivity or network devices 612.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution.

In some embodiments, the secondary storage 604 has a processing component 604a comprising non-transitory instructions operative by the processor 602 to perform various operations of the method of the present disclosure. The ROM 606 is used to store instructions and perhaps data which are read during program execution. The secondary storage 604, the ROM 606, and/or the RAM 608 may be referred to in some contexts as computer readable storage media and/or non-transitory computer readable media.

I/O devices 610 may include printers, video monitors, liquid crystal displays (LCDs), plasma displays, touch screen displays, keyboards, keypads, switches, dials, mice, track balls, voice recognizers, card readers, paper tape readers, or other input devices.

The system connectivity or network devices 612 may take the form of modems, modem banks, Ethernet cards, universal serial bus (USB) interface cards, serial interfaces, token ring cards, fiber distributed data interface (FDDI) cards, wireless local area system (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other system devices. These system connectivity or network devices 612 may enable the processor 602 to communicate with the Internet or one or more intranets. With such a system connection, it is contemplated that the processor 602 might receive information from the system, or might output information to the system in the course of performing the above-described method operations. Such information, which is often represented as a sequence of instructions to be executed using processor 602, may be received from and outputted to the system, for example, in the form of a computer data signal embodied in a carrier wave.

The processor 602 executes instructions, codes, computer programs, scripts which it accesses from hard disk, floppy disk, optical disk (these various disk based systems may all be considered secondary storage 604), flash drive, ROM 606, RAM 608, or the system connectivity or network devices 612. While only one processor 602 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing an application and/or applications in a cloud computing environment. Cloud computing may comprise providing computing services via a system connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 602, the ROM 606, and the RAM 608 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

The invention claimed is:

1. A payment network server for processing an electronic commerce (e-commerce) transaction initiated by a customer, the server comprising at least a computer processor and a data storage device, the data storage device comprising instructions operative by the processor to:
receive, from a merchant server, an authentication request, the authentication request comprising at least a payment card identifier associated with a payment card;
generate an authentication code associated with the e-commerce transaction for authenticating the customer, a portion of the authentication code comprising a unique identifier;
store, in a payment network database, the authentication code as a stored authentication code;
transmit the unique identifier to the merchant server, wherein the merchant server presents the unique identifier to the consumer via a merchant website associated with the merchant server;
transmit the authentication code and an indication of the payment card to an issuer server, wherein the issuer server communicates the authentication code to the customer;
receive, from the merchant server, a customer entered authentication code which was entered by the customer into the merchant website;
determine if the customer entered authentication code matches the stored authentication code; and
if the customer entered authentication code matches the stored authentication code:
generate an authentication indication;
store, in the payment network database, the authentication indication as a stored authentication indication; and
transmit, to the merchant server, an authentication response comprising the authentication indication.

2. The server of claim 1, wherein the processor is further configured to:
receive, from the merchant server, a transaction request comprising a received authentication indication, the payment card identifier and a payment amount associated with the e-commerce transaction;
determine if the received authentication indication matches the stored authentication indication;
generate an on-behalf service message if the received authentication indication matches the stored authentication indication, the on-behalf service message indicating that the e-commerce transaction has been authenticated;
transmit, to the issuer server, an authorisation request comprising the on-behalf service message, the indication of the payment card and the payment amount;
receive, from the issuer server, an authorisation response indicating if the e-commerce transaction is authorised or refused; and
transmit, to the merchant server, a transaction response indicating whether the e-commerce transaction is approved or refused, the e-commerce transaction is approved if it is authorised.

3. The server of claim 1, wherein the merchant website is designed using an application programming interface associated with the payment network server.

4. The server of claim 1, wherein the payment card identifier comprises a payment card number of the payment card.

5. The server of claim 1, wherein the payment card identifier comprises a token, the processor is further configured to identify, using the payment network database, a payment card number associated with the token, and the indication of the payment card.

6. The server of claim 1, wherein the authentication code is a one-time password.

7. The server of claim 1, wherein the authentication code is valid for a predetermined authentication code time period.

8. The server of claim 1, wherein the authentication indication is valid for a predetermined authentication indication time period.

9. The server of claim 8, wherein the predetermined authentication indication time period is determined by the issuer server.

10. The server of claim 1, wherein the authentication indication is an accountholder authorisation value (AAV) or a cardholder authentication verification value (CAVV).

11. A computerised method for processing an e-commerce transaction initiated by a customer, the method comprising:
receiving, from a merchant server, an authentication request, the authentication request comprising at least a payment card identifier;
generating an authentication code associated with the e-commerce transaction for authenticating the customer, a portion of the authentication code comprising a unique identifier;
storing, in a payment network database, the authentication code as a stored authentication code;
transmitting the unique identifier to the merchant server, wherein the merchant server presents the unique identifier to the consumer via a merchant website associated with the merchant server;
transmitting the authentication code and an indication of the payment card to an issuer server, wherein the issuer server communicates the authentication code to the customer;
receiving, from the merchant server, a customer entered authentication code which was entered by the customer into a merchant website associated with the merchant server;
determining if the customer entered authentication code matches the stored authentication code; and
if the customer entered authentication code matches the stored authentication code:
generating an authentication indication;
storing, in the payment network database, the authentication indication as a stored authentication indication; and
transmitting, to the merchant server, an authentication response comprising the authentication indication.

12. The method of claim 11 further comprising:
receiving, from the merchant server, a transaction request comprising a received authentication indication, the payment card identifier and a payment amount associated with the e-commerce transaction;
determining if the received authentication indication matches the stored authentication indication;
generating an on-behalf service message if the received authentication indication matches the stored authentication indication, the on-behalf service message indicating that the e-commerce transaction has been authenticated;
transmitting, to the issuer server, an authorisation request comprising the on-behalf service message, the indication of the payment card and the payment amount;
receiving, from the issuer server, an authorisation response indicating if the e-commerce transaction is authorised or refused; and
transmitting, to the merchant server, a transaction response indicating whether the e-commerce transaction is approved or refused, the e-commerce transaction is approved if it is authorised.

13. The method of claim 11, wherein the merchant web site is designed using an application programming interface associated with the payment network server.

14. The method of claim 11, wherein the payment card identifier comprises a payment card number associated with the payment card.

15. The method of claim 11, wherein the payment card identifier is in the form of a token, the method further comprises identifying, using the payment network database, a payment card number associated with the token, and the indication of the payment card.

16. The method of claim 11, wherein the authentication code is a one-time password.

17. The method of claim 11, wherein the authentication code is valid for a predetermined authentication code time period.

18. The method of claim 11, wherein the authentication indication is valid for a predetermined authentication indication time period.

19. The method of claim 18, wherein the predetermined authentication indication time period is determined by the issuer server.

20. A non-transitory computer-readable medium having stored thereon program instructions for causing at least one processor to:
receive, from a merchant server, an authentication request, the authentication request comprising at least a payment card identifier;
generate an authentication code associated with the e-commerce transaction for authenticating the customer, a portion of the authentication code comprising a unique identifier;
store, in a payment network database, the authentication code as a stored authentication code;
transmit the unique identifier to the merchant server, wherein the merchant server presents the unique identifier to the consumer via a merchant website associated with the merchant server;
transmit the authentication code and an indication of the payment card to an issuer server, wherein the issuer server communicates the authentication code to the customer;
receive, from the merchant server, a customer entered authentication code which was entered by the customer into a merchant website associated with the merchant server;
determine if the customer entered authentication code matches the stored authentication code; and
if the customer entered authentication code matches the stored authentication code:
generate an authentication indication;
store, in the payment network database, the authentication indication as a stored authentication indication; and
transmit, to the merchant server, an authentication response comprising the authentication indication.

* * * * *